Oct. 28, 1952     W. J. MEANS     2,615,961
MAGNETIC TESTING SYSTEM
Filed Dec. 7, 1946     2 SHEETS—SHEET 1
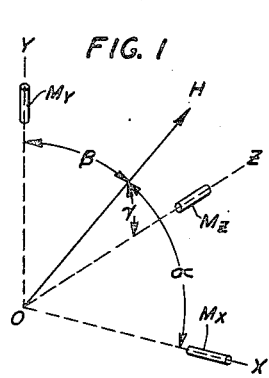
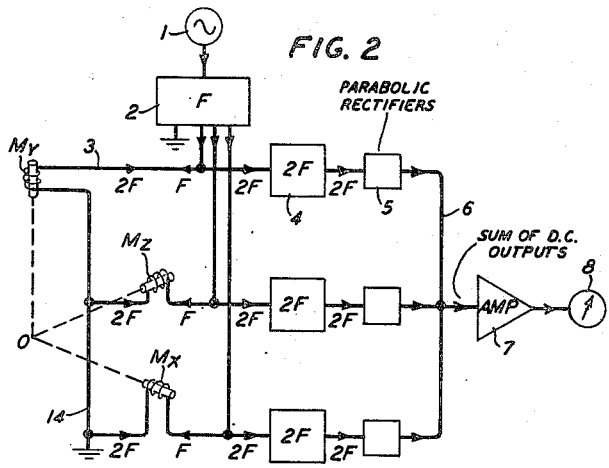
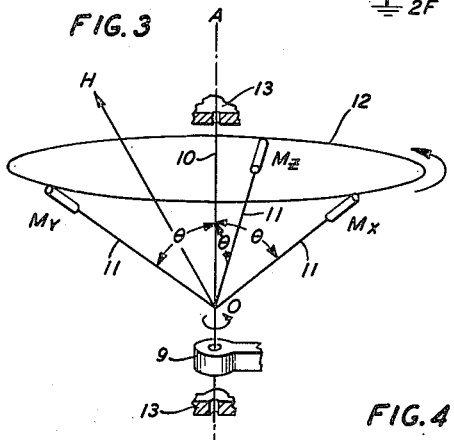
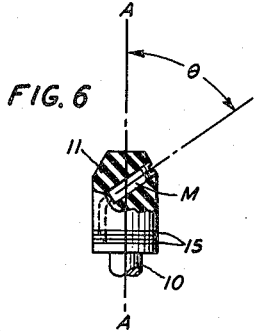
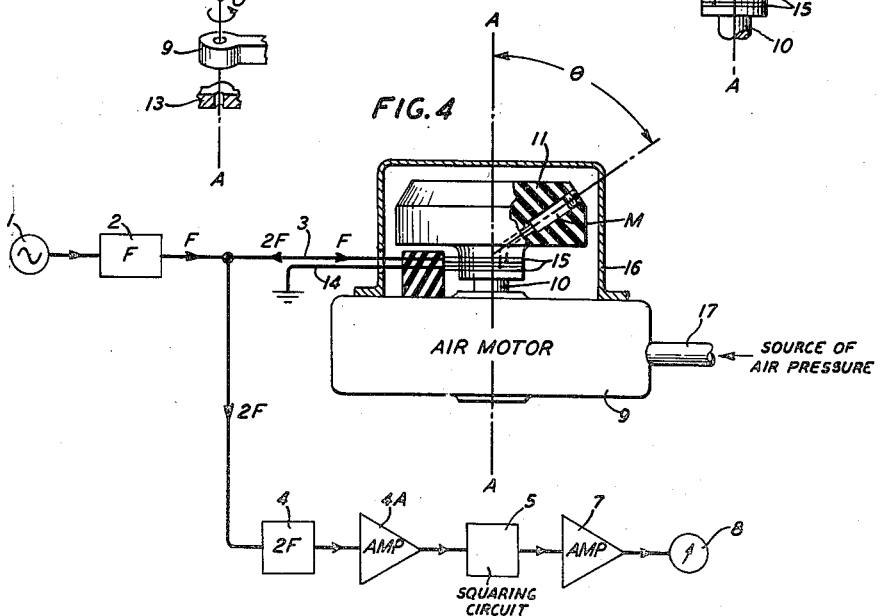
INVENTOR
W. J. MEANS
BY
Walter M. Hiel
ATTORNEY Oct. 28, 1952 — W. J. MEANS — 2,615,961
MAGNETIC TESTING SYSTEM
Filed Dec. 7, 1946 — 2 SHEETS—SHEET 2
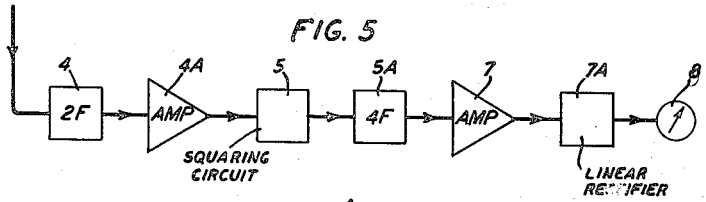
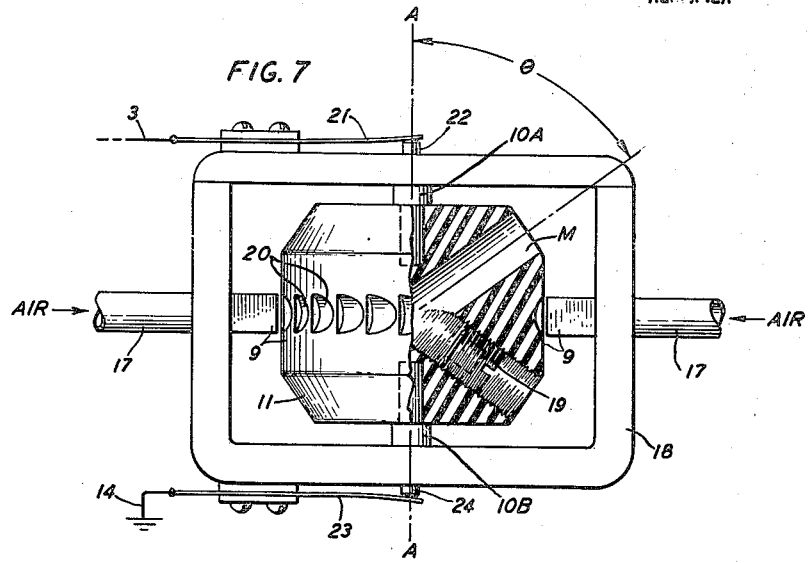
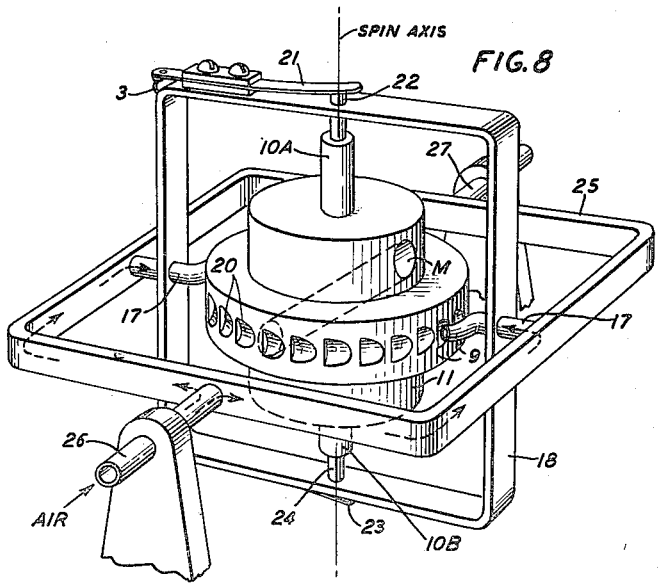
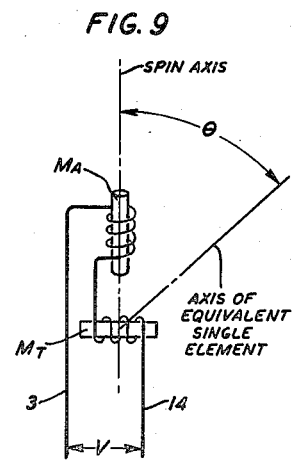
INVENTOR
W. J. MEANS
BY
Walter M. Hill
ATTORNEY Patented Oct. 28, 1952

2,615,961

UNITED STATES PATENT OFFICE 2,615,961

MAGNETIC TESTING SYSTEM

Winthrop J. Means, Summit, N. J., assignor to Bell Telephone Laboratories, Incorporated, New York, N. Y., a corporation of New York Application December 7, 1946, Serial No. 714,765

9 Claims. (Cl. 175—183)

This invention relates to the measurement of magnetic field strength and more particularly it is directed to the measurement of the total magnetic field strength or variations thereof.

It is a well-known fact that the earth's magnetic field over any given limited area is substantially uniform except that this uniformity may suffer distortion in the presence of paramagnetic or diamagnetic material. This distortion usually results in a change in both the direction and intensity of the total magnetic field. In most cases the paramagnetic or diamagnetic body which produces the magnetic distortion is located at a considerable distance from the field strength measuring or indicating device and if the magnetic effect of the distorting material is to be detected the measuring or indicating device must be highly sensitive.

In a copending application of T. Slonczewski, Serial No. 483,756, filed April 20, 1943, now Patent 2,485,931, there is disclosed a system capable of indicating changes in the total magnetic field. That system comprises essentially three stationary magnetometer units having their principal magnetic axes mutually perpendicular. Windings are placed on cores of each of these magnetometers which are excited with a voltage of fundamental frequency whereby voltages of second harmonic frequency are induced in each of the magnetometers of magnitudes proportional, respectively, to the direction cosine of the angle formed by the principal axis of each magnetometer and the direction of the total magnetic field. A means for squaring each of the second harmonic voltages is provided. Also a means for adding together the resulting squared second harmonic currents and means for indicating the sum of these currents are provided. That system will be described in sufficient detail later on in this application to enable a full and complete understanding of this invention.

In another copending application of E. P. Felch and T. Slonczewski, Serial No. 483,754, also filed on April 20, 1943, now Patent 2,427,666, there is disclosed a total field measuring system somewhat similar to the copending Slonczewski application cited above but differing therefrom in that a different squaring system is employed for squaring the outputs from the three mangnetometer elements. As will hereinafter appear, any of these squaring systems may be employed in the practice of this invention.

While the systems described in the above-mentioned copending applications are basically sound in principle and are very useful for a great many applications, there are instances where it is desirable to have a considerably simplified and lighter weight equipment, for example, in some airborne applications where weight is a special consideration.

It is an object of this invention to provide a simplified total magnetic field detector capable of measuring the absolute field strength of a magnetic field or changes in its strength independent of extraneous influences or changes in the direction of the magnetic field.

It is a further object of this invention to provide a total field detector utilizing less than three orthogonally disposed magnetometer elements but still retaining the effect of having used all three elements.

The foregoing objects are achieved by this invention which comprises in combination a magnetometer having at least one detector means of magnetic material having an effective principal magnetic axis, electromagnetic windings surrounding said magnetic material for connection to a source of alternating current, a support for the detector means having a mechanical axis of rotation, said support holding the detector means with its effective principal magnetic axis inclined to the mechanical axis at a fixed angle substantially equal to an angle whose cosine is $$\frac{1}{\sqrt{3}}$$

and means for spinning said support including the detector means about its mechanical axis.

The invention may be better understood by referring to the accompanying drawings in which:

Fig. 1 schematically discloses a three-magnetometer system with the principal axes of the magnetometers mutually perpendicular and each forming an angle with the direction of the magnetic field vector;

Fig. 2 schematically discloses the principal circuit features of one of the three-element magnetometer systems disclosed in the copending applications cited above;

Fig. 3 is an elementary schematic disclosure illustrating the principles of this invention;

Fig. 4 discloses one elementary physical embodiment of the present invention;

Fig. 5 shows a modified circuit arrangement which may be substituted for the indicating circuit shown in Fig. 4;

Fig. 6 discloses a modification of the rotor arrangement of Fig. 4 showing the magnetometer element with the mechanical axis of rotation passing through its center;

Fig. 7 discloses another mechanical embodiment of the invention which may be substituted for the mechanical arrangement shown in Fig. 4;

Fig. 8 discloses a still further embodiment of the invention utilizing the principles of a gyroscope for stabilizing the detector system against rapid changes in orientation with respect to any given reference axis in space; and Fig. 9 shows a slightly different arrangement in which two magnetometer elements are used instead of one to get the same effect as a single element but to avoid the distorting effects of centrifugal force on the inclined magnetometer element shown in the other figures.

Fig. 1 shows the three magnetometers with their principal axes mutually disposed perpendicularly with each other. This may be referred to as an orthogonal array of the three magnetometers. These magnetometers are shown, for purposes of description, with their principal axes corresponding to the three principal axes employed with rectangular Cartesian coordinates and are designated the X, Y and Z axes, respectively. The magnetic field is indicated as a vector H passing through the origin O and forming angles with each of the three coordinate axes. In Fig. 1 the angle formed with the X axis is shown as $\alpha$, the angle formed with the Y axis as $\beta$ and the angle formed with the Z axis as $\gamma$.

The three magnetometers designated in Fig. 1 as $M_X$, $M_Y$ and $M_Z$ each comprises essentially a length of low retentivity magnetic material, preferably of high permeability, upon which one or more windings are wound. It is known that when the magnetic field is at right angles to the principal axis of the core and the winding is excited by a voltage of fundamental frequency, no even order harmonics will be generated in the winding. On the contrary if the magnetic field has a component in the direction of the principal axis of the core and the winding be excited by a voltage of fundamental frequency even order harmonic voltages will be generated therein. The magnitudes of these harmonic voltages will each be proportional to the cosine of the angle formed by the principal axis of the magnetometer and the direction of the magnetic field. While any one or more of these even order harmonics can be used, the second harmonic is selected in illustrating this invention.

It can be shown mathematically that the sum of the squares of these three second harmonic voltages is entirely independent of the orientation of the three magnetometers with respect to the direction of the magnetic field providing the three magnetometers retain their mutually perpendicular relationship and they are equally sensitive. It can also be shown that the square-root of the sum of the squares of these second harmonic voltages is proportional to the absolute strength of the total magnetic field and likewise independent of the orientation of the magnetometer system with respect to the direction of the magnetic field. It is upon this fundamental principle that this invention and the inventions of the two copending applications cited above are based.

The three magnetometers shown in Fig. 1 may be mounted by any suitable means so that their principal axes are mutually perpendicular. An actual disclosure of this means is not necessary to the understanding of this invention. However, a suitable means is disclosed in the above cited copending application of T. Slonczewski. For the purposes of this invention it may merely be stated that the mounting means may comprise any non-magnetic support capable of holding the three magnetometers in mutually perpendicular relationship. It may be further stated that the three principal axes of the magnetometers themselves need not intersect at a single point, such as the origin O shown in Fig. 1. However, it is a definite requirement that each principal axis should be at least parallel with the axis shown for it in Fig. 1.

Referring now to Fig. 2 the three-element total field detector system of the copending applications will be very briefly described for a better understanding of this invention. The three magnetometers $M_X$, $M_Y$ and $M_Z$ are excited by currents of fundamental frequency F coming from a source of alternating current 1 which may be an electronic oscillator or other generator of alternating electric current. Most generators produce a series of harmonics as well as a fundamental frequency so a filter 2 passing only the fundamental frequency F is interposed between the source of alternating current 1 and the three magnetometers. The output from this filter is fed over conductors as, for example, conductor 3 to the three magnetometers, thereby exciting them with alternating current of frequency F. As previously stated these magnetometers will in turn produce even order harmonic voltages proportional to the cosine of the angle formed between their principal axes and the direction of the magnetic field.

In order to get an indication proportional to the total magnetic field, it is necessary that an even order harmonic be taken from each of the three magnetometers, suitably squared and added together. This is, of course, in accordance with the fundamental principle just stated in a previous paragraph. In Fig. 2 this is accomplished by selecting the second harmonic voltage of frequency 2F from each of the three magnetometers, which frequency is selected and passed by individual filters as, for example, filter 4 for magnetometer channel $M_Y$. These second harmonic voltages are then rectified by suitable means as, for example, parabolic rectifier 5 shown in Fig. 2. The output rectified currents, which are individually proportional to the square of their input second harmonic voltages, are added together, amplified by an amplifier 7, and observed by a suitable indicator or recorder 8 which may comprise, for example, a conventional D'Arsonval galvanometer movement which is known to be responsive to the average of a rectified alternating current wave.

It will be noted that in Fig. 2 the system requires separate filters and rectifiers for each of the magnetometers. Also the filter 2 interposed between the source of alternating current 1 and the magnetometers must have three separate output channels. In accordance with this invention this system may be greatly simplified by utilizing only one magnetometer element and consequently only one second harmonic filter and rectifier channel.

To better understand this invention in its relation to the three-element system just described, reference may be made to Fig. 3. This invention is based upon the discovery that if the three magnetometer elements of Fig. 2 be so disposed with respect to a mechanical axis of rotation A—A that they form equal angles $\theta$ therewith, the three elements will follow identical paths and describe identical cones of revolution. Whether this orthogonal array of the three elements is stationary or rotating the summation of the squares of the outputs of the elements will still remain constant. Since the three magnetometer elements are identical or have been made effectively identical by the electrical circuits and since they follow identical paths, the energy contribution of each over one complete revolution is identical with that from each of the other two. This suggests that one element could do the work of three providing it rotates in the cone of revolution which would be generated by the three perpendicular elements and provided that means are available for accurately squaring and responding proportional to the average value which is the integral of the squared output. In Fig. 3 the mechanical system is schematically illustrated as being rotated about the mechanical axis A—A by a suitable driving motor means 9, the mechanical shaft 10 spinning in suitable bearings 13, 13. The three magnetometers are attached to the mechanical shaft 10 by means of suitable supporting members 11 and it is assumed, of course, that the electrical connections to the magnetometers may be made through slip rings of well-known construction commonly used in connection with rotating electrical machinery. When such an array of elements having their axes mutually perpendicular to each other is arranged to rotate about a mechanical axis in the manner just described, the angle $\theta$ between the mechanical axis and the axes of the three elements can be shown to be equal to an angle whose cosine is $$\frac{1}{\sqrt{3}}$$

It can be proved mathematically that one spinning magnetometer arranged as schematically shown in Fig. 3 can take the place of all three elements for measurement purposes.

Such an arrangement with a single element is shown in Fig. 4 where the magnetometer M is shown inclined to the mechanical axis of rotation A—A by an angle $\theta$ whose cosine is equal to $$\frac{1}{\sqrt{3}}$$

This magnetometer M may be supported by any suitable rotor 11 of non-magnetic material. The rotor 11 is mechanically rotated by a suitable motor as, for example, an air motor 9 through a shaft 10. When so rotated it will be observed that the magnetometer M of Fig. 4 will follow the path of an inverted cone similar to cone 12 shown in Fig. 3. It is immaterial what angle the mechanical axis A—A makes with the direction of the total field vector H. In Fig. 3 the total field vector H was shown in any arbitrary position with respect to the mechanical axis A—A. This is also true in Fig. 4. The air motor 9 may be driven by air received from a suitable tube 17. As such air motors are commonly used in connection with gyroscopes and other small spinning devices it need not be described in detail. Other motor means may also be employed providing, of course, proper means are employed to prevent magnetic interaction or spurious distortion of the magnetic field being measured.

The electrical connections to the magnetometer M in Fig. 4 are made through slip rings 15 of conventional design. Suitable brushes cooperating with the slip rings 15, also of conventional design, are provided so that one slip ring may be grounded through a conductor 14 while the other is connected, by way of conductor 3, to the source of alternating current 1 and the circuit of indicator 8. The even order harmonic output from the magnetometer M is carried through a second harmonic filter 4, amplified by an amplifier 4A, squared by the squaring circuit 5, again amplified by the amplifier 7 and indicated or recorded by the indicator or recorder 8. This electrical circuit will be observed to be essentially identical with any one of the three channels in Fig. 2. It is obvious that, as a natural consequence of reducing the number of channels, the number of electrical connections to the magnetometers are also reduced. This is a very desirable result as, among other things, it reduces the diameter of the cable to the magnetometers.

With the source of air pressure applied to the tube 17 so that the rotor 11 spins rapidly about its mechanical axis A—A, the magnetometer may be placed in any position with respect to the direction of the total field vector H. The output observed by meter 8 will be theoretically independent of the orientation of the magnetometer system with respect to the direction of the field. To protect the rotating mechanism from injury a suitable non-magnetic shield or guard 16 may be placed thereover as illustrated in Fig. 4.

Referring briefly to Fig. 5 it will be noted that the electrical circuit has been somewhat elaborated. This circuit may be substituted for the one shown in Fig. 4. It will be noted that a band-pass filter 5A for the fourth harmonic 4F follows the squaring circuit 5. In this figure the squaring circuit is assumed to be of the harmonic generation type as disclosed in the above-mentioned copending joint application of E. P. Felch and T. Slonczewski. It is a known fact that with this type of harmonic generator the second harmonic of its input frequency is proportional in amplitude to the square of the amplitude of the input frequency. In the case of the squaring circuit 5 of Fig. 5 the input frequency is of second harmonic frequency 2F so that the fourth harmonic output 4F is proportional in amplitude to the square of the amplitude of the input to the squaring circuit 5. Due to the use of a harmonic generator for squaring rather than the parabolic or square law rectifier shown in Fig. 4, it is necessary, if indication by a direct current instrument 8 is desired, to employ a rectifier 7A. The components of this circuit, of course, are all well known to the electronic art. In some cases this arrangement may be somewhat more useful than the parabolic rectifier arrangement of Fig. 4.

In Fig. 6 a modification of the rotor arrangement of Fig. 4 is disclosed. The rotor 11 in this case supports the magnetometer M so that the mechanical axis of rotation A—A passes through the center of the magnetometer element M. This arrangement is more symmetrical than the one shown in Fig. 4 and provides a better mechanical balance. Also it reduces the effect of the centrifugal force on the magnetometer itself due to the fact that the centrifugal forces reduce rapidly as the axis of rotation is approximated. The reference numerals in this figure correspond with those in Fig. 4.

In Fig. 7 there is disclosed a different mechanical arrangement of the rotor mechanism. This rotor is of the type more commonly employed in gyroscopes. The magnetometer element M is again inclined to the mechanical axis of rotation A—A by the angle $\theta$ previously defined. The rotor is caused to spin about the mechanical axis by an air motor 9 comprising a plurality of buckets or vanes 20 around the outer periphery of the rotor 11 which are acted upon by an air stream from the two air nozzles 17. All parts of this mounting arrangement should be of non-magnetic material. It is also preferable that the rotor 11 be made of non-conducting material as well as non-magnetic. The shaft 10 may then be made in two parts 10A and 10B and fitted to opposite ends of the rotor 11 as clearly shown in Fig. 7. These shafts 10A and 10B may cooperate with suitable bearings in the frame 18 which may be miniature ball bearings or any other type of low friction bearing. The outer ends of the two shafts may extend beyond the frame 18 as at 22 and 24 and cooperate with brushes 21 and 23 to take the place of the slip rings shown in Fig. 4. The electrical connections to the magnetometer element M may then be carried out through the shafts 10A, 10B to the brushes 21 and 23. Brush 23, for example, may be grounded by a lead 14 in the same manner as indicated in Fig. 4, while brush 21 may be connected to the conductor 3 of Fig. 4. The electrical circuits are identical with those previously described. Another feature shown in Fig. 7 is the balancing plug 19. Two of these plugs are preferably employed on opposite sides of the rotor and symmetrically disposed with respect to the magnetometer element M. These plugs 19 may be adjusted to provide dynamic balance in accordance with well established mechanical principles.

Although this arrangement is theoretically independent of its position with respect to the direction of the magnetic field vector to be measured, it is, like any other piece of precision equipment, not exactly perfect. When the apparatus is used to measure very small changes in the total magnetic field and where great sensitivity is required as to these changes, for example, in the order of one or two gammas or less, it is desirable that the mechanical axis of spin be reasonably well stabilized against any rapid changes in its direction in space. One very convenient way of doing this is to employ the rotor of a gyroscope as the mount 11 for the magnetometer. Such an arrangement has been found to considerably improve the sensitivity which may be realized, particularly to small changes in field. An arrangement of this type is shown in Fig. 8. In this figure the rotor 11 of non-magnetic material supports the magnetometer M in the same manner as illustrated in Figs. 6 and 7. This rotor carries symmetrically about its center an annular portion of relatively large moment of inertia on the outer periphery of which are found the vanes or buckets 20 for driving the rotor. These buckets together with the two air jets 17, 17 comprise an air motor 9 as previously described in Fig. 7. The air nozzles or jets 17 are rigidly attached to the inner gyro ring 18 so that the direction of the air flow will be always against the buckets 20.

The outer ends of nozzles 17, 17 merge into air sealed bearings in outer ring 25 to provide a support for the inner ring 18 for rotation about a second axis at right angles with the spin axis of the rotor. The outer ring 25 is supported by the shafts 26 and 27 for mechanical rotation about a third axis perpendicular to the second axis. Air enters the mechanical system through a hollow portion of shaft 26 and follows the hollow outer ring 25 in the paths indicated by the dotted arrows. From the hollow ring 25 the air enters the hollow shaft supporting the inner ring 18 from which it passes through and emerges from the nozzles or jets 17 to cause rotation of the rotor about the axis of spin. The principles of the gyroscope and its modus operandi are now well known to the mechanical arts and any further description of the details thereof insofar as this invention is concerned is believed wholly unwarranted.

It will be apparent from Fig. 8 and from the description thereof that the rotor mount 11 will rapidly carry the magnetometer element M about the spin axis describing a double cone having an angle $\theta$ with the spin axis as previously defined in this specification. It will also be apparent that due to the fundamental properties of a rotating body, the rotor 11 will be very well stabilized against any rapid changes of its position with respect to an initial spin axis taken up by the rotor. This adequately prevents any rapid changes in angle between the spin axis and the direction of the total field vector. Of course, it is obvious to anyone skilled in the art that this gyroscope may be gravity stabilized by conventional means, not shown. Most any of the other refinements peculiar to the gyroscope art may also be incorporated providing they are not of a nature to introduce spurious magnetic signals.

The electrical connections to the magnetometer M may be carried out from the shaft extensions 22, 24 in substantially the same manner indicated for Fig. 7, or the slip rings 15 of Fig. 4 may be employed. Also, the conductors from the brushes as, for example, conductor 3 shown in Fig. 8 may be carried off ring 18 to ring 25 by means of a slip ring, not shown in Fig. 8 but which may take the same form as those shown in Fig. 4, or any other conventional slip ring arrangement. Where the gyroscope has been carefully stabilized and large angular excursions are not normally expected, slip rings may be eliminated and the connection may be carried through the center of the shaft by means of a flexible conductor.

Due to the inclination of the axis of magnetometer M with respect to the spin axis A—A, as for example shown in Figs. 6 and 7, the centrifugal forces may cause the magnetometer, particularly at high speed, to take on a slight S-shape. While this effect is not particularly serious for ordinary measurements, it may be substantially eliminated by the arrangement shown in Fig. 9. In this figure, two magnetometer elements $M_A$ and $M_T$ are arranged with their principal axes mutually perpendicular. The principal axis of the magnetometer $M_A$ is coaxial with the spin axis while the principal axis of the transverse magnetometer $M_T$ is transverse to the spin axis. In this arrangement it will be obvious that centrifugal forces do not produce a lateral distortion of either of the elements. It can be shown mathematically that two such elements arranged with their windings connected in series can be treated as vectors having a resultant effect equivalent to a single magnetometer inclined at an angle with respect to the spin axis. By proper adjustment of the circuit parameters of the two magnetometers this angle may be made equal to the angle $\theta$ as previously defined in this specification. Magnetometers thus arranged may be mounted in any of the mounts previously described and the electrical connections thereto may also be made in the same manner as previously described.

From the description of the invention in connection with Fig. 3 it is quite evident that any number of magnetometer elements may actually be used providing they are arranged in the manner shown in Fig. 3 so that they described identical cones of revolution. It will therefore be understood that while it is advisable for purposes of simplification and low cost construction to use only a single magnetometer, the invention is not to be regarded as limited to only one magnetometer. Also it is quite evident from Fig. 9 and the previous description thereof, that where two elements are used to produce a resultant equivalent to a single element, these two elements may form an angle with each other different from 90 degrees. This will be apparent when it is understood that the two elements may be treated as vectors and it is only necessary that their vector resultant form the angle θ as defined in this specification. Therefore, in a more general case any arrangement of two or more elements which produces a vector resultant equivalent to a single element rotated about a spin axis at the angle θ described above will satisfy the requirements of this invention and comes within the scope of its teaching.

What is claimed is:

1. A total field magnetometer for producing an electric output which is a function of the total magnetic field in which the magnetometer is immersed, said magnetometer comprising at least one detector means of magnetic material having an effective principal magnetic axis, electromagnetic windings surrounding said magnetic material for connection to a source of alternating current, a support for said detector means having a mechanical axis of rotation, said support holding the detector means with its effective principal magnetic axis inclined to the mechanical axis at a fixed angle substantially equal to an angle whose cosine is $$\frac{1}{\sqrt{3}}$$

and means for spinning said support including the detector means about its mechanical axis.

2. A total field magnetometer for producing an electric output which is a function of the total magnetic field in which the magnetometer is immersed, said magnetometer comprising a detector means of magnetic material having an effective principal magnetic axis, electromagnetic windings surrounding said magnetic material for connection to a source of alternating current, a support for said detector means having a mechanical axis of rotation, said support holding the detector means with its effective principal magnetic axis inclined to the mechanical axis at a fixed angle substantially equal to an angle whose cosine is $$\frac{1}{\sqrt{3}}$$

and means for spinning said support including the detector means about its mechanical axis.

3. A total field magnetometer for producing an electric output which is a function of the total magnetic field in which the magnetometer is immersed, said magnetometer comprising at least one detector means of magnetic material having an effective principal magnetic axis, electromagnetic windings surrounding said magnetic material for connection to a source of alternating current, a nonmagnetic rotor having a mechanical axis of rotation, said rotor holding the detector means with its effective principal magnetic axis inclined to the mechanical axis at a fixed angle substantially equal to an angle whose cosine is $$\frac{1}{\sqrt{3}}$$

and a non-magnetic motor means for spinning said rotor about its mechanical axis.

4. A total field magnetometer for producing an electric output which is a function of the total magnetic field in which the magnetometer is immersed, said magnetometer comprising a detector means of magnetic material having an effective principal magnetic axis, electromagnetic windings surrounding said magnetic material for connection to a source of alternating current, a non-magnetic rotor having a mechanical axis of rotation, said rotor holding the detector means with its effective principal magnetic axis inclined to the mechanical axis at a fixed angle substantially equal to an angle whose cosine is $$\frac{1}{\sqrt{3}}$$

and a non-magnetic motor means for spinning said rotor about its mechanical axis.

5. The combination in accordance with claim 2 wherein said detector means comprises a single core of magnetic material having a principal magnetic axis.

6. The combination in accordance with claim 4 wherein said detector means comprises a single core of magnetic material having a principal magnetic axis.

7. The combination in accordance with claim 1 wherein said support for said detector means comprises the rotor of a gyroscope whereby said mechanical axis of rotation of said rotor is stabilized against angular excursions in space.

8. The combination in accordance with claim 2 wherein said support for said detector means comprises the rotor of a gyroscope whereby the mechanical axis of rotation of said rotor is stabilized against angular excursions in space.

9. A system for indicating the field strength of magnetism comprising in combination a magnetometer core of magnetic material having a principal magnetic axis, at least one winding on said core, a source of alternating current coupled to a winding on said core whereby even order harmonic voltages are produced therein of magnitudes proportional to the product of the field strength and the cosine of the angle formed between the principal axis of the core and the direction of a magnetic field, an electric squaring means coupled to a winding on said core and responsive to a selected one of said even order harmonic voltages for producing a current varying as the square of said selected voltage, an indicating means coupled to the squaring means and responsive to said current, a support for said core comprising the rotor of a gyroscope arranged for rotation about a mechanical axis and for supporting the core with its principal magnetic axis inclined to said mechanical axis by an angle substantially equal to the angle whose cosine is $$\frac{1}{\sqrt{3}}$$

and means for spinning said rotor support including the core about its mechanical axis.

WINTHROP J. MEANS.

REFERENCES CITED

The following references are of record in the file of this patent:

UNITED STATES PATENTS

| Number | Name | Date |
| --- | --- | --- |
| 1,988,521 | Sperry et al. | Jan. 22, 1935 |
| 2,331,617 | Moore | Oct. 12, 1943 |
| 2,427,666 | Felch et al. | Sept. 23, 1947 |